May 19, 1953  H. G. HAAS  2,639,413
FREQUENCY REGULATOR
Filed Jan. 13, 1950

INVENTOR.
HAROLD G. HAAS
BY
-ATTORNEY-

Patented May 19, 1953

2,639,413

UNITED STATES PATENT OFFICE 2,639,413

FREQUENCY REGULATOR

Harold G. Haas, Belleville, N. J., assignor to Bendix Aviation Corporation, Teterboro, N. J., a corporation of Delaware Application January 13, 1950, Serial No. 138,436

6 Claims. (Cl. 322—24)

The present invention relates to electrical regulating systems and more particularly to a voltage and frequency regulating system for a dynamoelectric inverter.

It is often necessary to provide a constant frequncy alternating current from a direct current source such as a battery or D. C. generator wherein the D. C. voltage is subject to fluctuations. One of the means for providing alternating current is an inverter driven from the D. C. source. However, as the frequency is primarily a function of speed of the inverter, the problem of frequency control arises as the speed tends to vary with the fluctuations of the D. C. voltage.

It is an object of the present invention to provide improved means responsive to the frequency in the output circuit for controlling the speed of the inverter and thereby the frequency whereby the frequency is maintained substantially constant.

Another object of the invention is to provide improved means for controlling the output frequency of an inverter.

Another object of the invention is to provide an improved push-pull frequency control.

Another object of the invention is to provide an improved frequency regulating system for a motor alternator.

These and other objects and features of the invention will appear more fully hereinafter from a consideration of the following description taken in connection with the accompanying drawing wherein one embodiment of the invention is illustrated by way of example.

Figure 1:
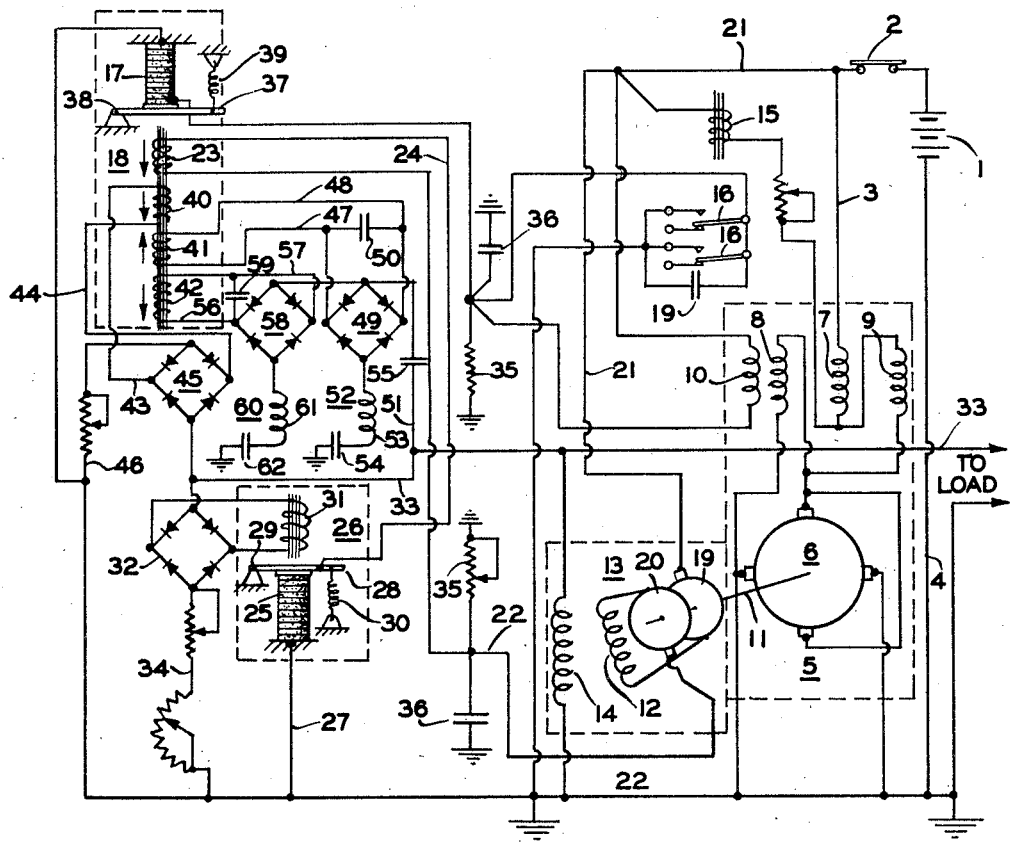
Figure 1 is a diagrammatic showing of a system embodying the invention.

Referring to Figure 1 of the drawing, there is provided a source of direct current which, for the purpose of illustration, is shown as a battery 1 and which is connected through switch 2, conductors 3 and 4 to a D. C. motor indicated generally by the numeral 5 and having an armature winding 6, series winding 7, shunt field winding 8, interpole winding 9, and regulator field winding 10 of conventional type.

The motor 5 drives through a shaft 11 diagrammatically represented by the dashed line 11, an exciting winding 12 of an alternator indicated generally by the numeral 13 having a stator winding 14. While a single phase alternator has been illustrated by way of example, a three phase system would also be applicable.

A motor full field relay winding 15 is connected across the series field winding 7 of the motor 5. Upon the closing of the starting switch 2, the inrush of current through the series field winding 7 due to the motor starting increases the voltage drop across the winding 7 to a value sufficient to cause the motor full field relay winding 15 to actuate relay switch members 16 to a closed position. The switch members 16 are biased in a normally open position by gravity or a spring or in any other suitable manner. The switch members 16 of the motor full field relay 15 are arranged so as to shunt out of operation a variable resistance or carbon pile element 17 of a frequency regulator indicated generally by the numeral 18. Upon the opening of the switch members 16 upon the decrease in current in the series field winding 7, the variable resistance 17 is connected in series with the regulator field 10 of the motor 6 and the source of electrical energy 1. A capacitor 19 is connected across the contacts of the switch members 16 to prevent excessive arcing of the contacts.

The exciting winding 12 is connected to slip rings 19 and 20. The ring 19 is connected by a conductor 21 to one contact of the switch 2, while the ring 20 is connected by a conductor 22 to one side of a winding 23 of the frequency regulator 18, the function of which will be explained later. The other end of the winding 23 is connected by a conductor 24 to one end of a variable resistance or carbon pile element 25 of a voltage regulator indicated generally by the numeral 26. The opposite end of the carbon pile element 25 is grounded by a conductor 27 so that upon the closing of the switch 2 the source of electrical energy 1 is connected through the carbon pile element 25 to the exciting winding 12 of the alternator 13.

The carbon pile regulator 26 may be of a type disclosed and claimed in U. S. Patent No. 2,481,771, granted to William G. Neild.

The voltage regulator 26 is shown diagrammatically as including an armature 28, pivoted at 29 and biased under tension of a spring 30 in a direction tending to decrease the resistance of the pile 25 and thereby increasing the energization of the exciting winding 12 so as to effect an increase in the voltage output of the alternator 13.

An electromagnetic winding 31 biases the armature 28 in a direction opposing the spring 30 and tending to increase the resistance of the carbon pile 25 so as to decrease the energization of the exciting winding 12 and thereby decrease the output voltage of the alternator 13.

The control coil 31 is connected to the output of a rectifier 32 having an A. C. input connected through conductor 33 and a grounded connection 34 across the stator winding 14 of the alternator 13. Thus the regulator 26 tends to regulate the output voltage of the alternator.

A resistor 35 and capacitor 36 may be connected in parallel across the carbon pile element 25 to reduce the inductive field discharge in the carbon pile element 25 to a quantity that does not burn the carbon pile.

The frequency regulator 18 is shown diagrammatically as including an armature 37, pivoted at 38 and biased under tension of spring 39 in a direction tending to decrease the resistance of the pile 17 and thereby increasing the energization of the regulator field 10 so as to effect a decrease in the speed of the motor 5. The carbon pile regulator 18 may be of a type disclosed and claimed in U. S. Patent No. 2,481,771, granted to William G. Neild.

Electromagnetic windings 40, 42 and the winding 23 coact to bias the armature 37 in a direction opposing the spring 39 and tending to increase the resistance of the carbon pile 17 so as to decrease the energization of the regulator field 10 and thereby increase the speed of the motor 5, while the winding 41, as will be explained, opposes the action of the winding 42.

The main control coil 40 is connected by conductors 43 and 44 across the output of a rectifier 45 having an A. C. input connected through the conductor 33 and a grounded connection 46 across the output of stator winding 14 of the alternator 13. The winding 40 is thus responsive to the output voltage of the alternator 13 and tends to increase the speed of the motor 5 in response to such voltage.

The control winding 41 is connected by conductors 47 and 48 across the output of a rectifier 49. A capacitor 50 is connected across the output terminals of the rectifier 49. The rectifier 49 is connected across the output of stator winding 14 by a conductor 51 and a series resonant circuit 52 comprising an inductance 53 and a capacitor 54. A voltage dropping capacitor 55 may be inserted in the conductor 51 to limit the voltage applied to the rectifier 49. The winding 41 is arranged so as to oppose the magnetic effect of the winding 40 and tends to decrease the speed of the motor 5 upon the alternator output frequency exceeding a predetermined value as will be explained.

The control winding 42 is connected by conductors 56 and 57 across the output of a rectifier 58. A capacitor 59 is connected across the output of the rectifier 58. The rectifier 58 is connected across the stator winding 14 by the conductor 51 and a series resonant circuit 60 comprising an inductance 61 and a capacitor 62. The winding 42 is arranged in additive relation with the winding 40 and opposes electromagnetic effect of the winding 41 and tends to increase the speed of the motor 5 upon the alternator output frequency falling below a predetermined value, as will be explained.

The frequency regulator 18 operates in the following manner:

The ampere turns of the coil 40 are so proportioned that for a predetermined output voltage condition the pull upon the armature 37 by the coil 40 will tend to balance the pull in the opposite direction of the spring 39. Thus, within a predetermined range the coil 40 will tend to balance the pull of the spring 39 at the predetermined voltage.

Figure 2:
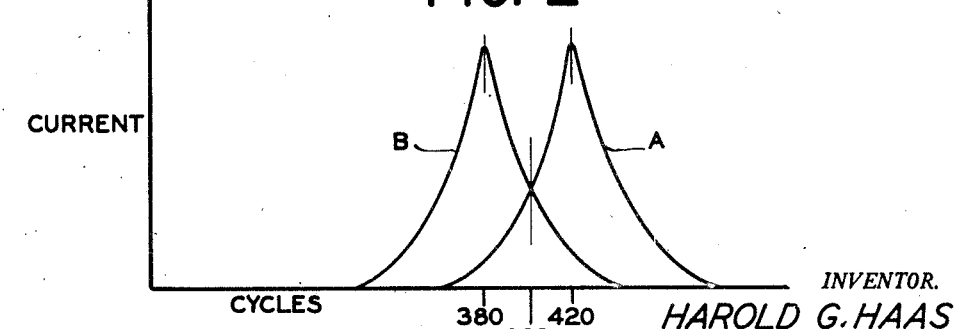
Figure 2 is a drawing illustrating graphically the operation of the invention.

The series resonant circuit 52 in the A. C. input circuit of the rectifier 49 is adjusted to resonate at a frequency slightly above the operating frequency and the series resonant circuit 58 in the A. C. input circuit of the rectifier 58 is adjusted to resonate at slightly below the operating frequency. The operation of the coils 41 and 42 may be best explained by reference to Figure 2, wherein, by way of example, the operating frequency may be 400 cycles. The series resonant circuit 52 is adjusted so as to resonate at 420 cycles as indicated by the curve A of Figure 2. The series resonant circuit 60 is adjusted so as to resonate at 380 cycles as indicated by the curve B of Fig. 2. At 400 cycles, the current in the coils 41 and 42 are opposing and equal and balance out their respective ampere turns. A shift in frequency from 400 cycles in either direction will give a push-pull effect from the coils 41 and 42 upon the armature 37 in a direction depending upon the direction of the shift to return the frequency to 400 cycles.

Thus, for example, upon the speed of the motor 5 increasing above the operating frequency of 400 cycles, the energization of the winding 41 would thereupon be increased while the energization of the winding 42 would be decreased.

The opposing electromagnetic force of the winding 41 would then decrease the electromagnetic force exerted on the armature 38 by the windings 23, 40 and 42 causing a decrease in the resistance of the carbon pile 17 so as to effect an increase in the energization of the regulator field 10 thereby in turn decreasing the speed of the motor 5 to the operating frequency.

Likewise, a decrease in the speed of the motor 5 to below the operating frequency of 400 cycles would cause the energization of the winding 42 to be increased while the energization of the winding 41 would be decreased causing in turn an increase in the resistance of the carbon pile 17 and an increase in the speed of the motor 5 to the operating frequency.

The coil 23 is responsive to the alternator load current and tends to increase the pull on the armature 37 and the speed of motor 5 with the application of load on the alternator and has an additive effect with the windings 40 and 42.

Thus, an improved frequency regulator has been provided wherein frequency in the output of a motor alternator may be held within narrow limits and the regulation is not appreciably affected by A. C. line voltage fluctuations.

Although only one embodiment of the invention has been illustrated and described, various changes in the form and relative arrangement of the parts, which will now appear to those skilled in the art, may be made without departing from the scope of the invention.

What is claimed is:

1. For use in a frequency regulating system for a motor driven alternator in which said motor has a winding for controlling the speed of said motor and thereby the output frequency of the alternator; the combination comprising means for regulating the energization of said speed control winding, an armature operatively connected to said regulating means, a spring biasing the armature in one direction to tend to operate said regulating means in one sense, a main winding biasing the armature in an opposite direction to tend to operate said regulating means in an opposite sense, a first auxiliary winding energized in a direction tending to operate the armature so as to cause said regulating means to effect a decrease in motor speed upon an increase in output frequency above a predetermined value, a second auxiliary winding energized in a direction tending to operate the armature so as to cause said regulating means to effect an increase in motor speed upon a decrease in alternator output frequency below said predetermined value, the energization of said auxiliary windings being equal and opposing at said predetermined value.

2. The combination defined in claim 1 in which said main winding acts upon said armature so as to tend to balance said spring means at any predetermined output voltage within a predetermined operating range.

3. The combination as defined by claim 1 and including a current winding responsive to output load to aid said main winding so as to tend to increase the motor speed with output load.

4. Apparatus for use in regulating the frequency of an alternating current generator driven by an electric motor, comprsing a control winding for controlling the speed of said motor, a variable resistance element for regulating the energizaion of said control winding, electromagnetic means for operating said variable resistance element, said electromagnetic means comprising a main control winding connected across the output of said generator and so arranged to hold said variable resistance element in a fixed position for a predetermined output, a first auxiliary winding including a first resonant circuit tuned to resonance above a predetermined frequency connected across the output of said generator, a second auxiliary winding including a second resonant circuit tuned to resonance below said predetermined frequency, the energization of said auxiliary windings being opposing and equal at said predetermined frequency and providing a push-pull effect to vary said resistance element in response to variations from said predetermined frequency.

5. Apparatus for use in regulating the output frequency and voltage of an alternating current generator driven by an electric motor, comprising voltage regulating means for maintaining the output voltage of said generator substantially constant, a source of electrical energy for energizing said electric motor, a field winding for controlling the speed of said motor and connected across the source of electrical energy, a variable resistance carbon pile element connected in the field winding circuit of said motor, electromagnetic means for regulating the carbon pile element including a first electromagnetic winding, a first rectifier, a circuit for connecting said first winding through said first rectifier to the output of said generator, a second electromagnetic winding, a second rectifier, a circuit for connecting said second winding through said second rectifier to the output of said generator, said last named circuit being resonant at a frequency above a predetermined operating frequency, a third electromagnetic winding, a third rectifier, a circuit for connecting said third winding through said third rectifier across said generator output, said last named circuit being resonant at a frequency below said predetermined operating frequency, said second and third windings being energized in opposing relation and coacting to effect said carbon pile element in response to variation of the output frequency from said predetermined operating frequency.

6. The combination as defined in claim 5 and including a fourth electromagnetic winding, a circuit for connecting said fourth winding in series relation with said voltage regulating means to effect said carbon pile element in response to output load current.

HAROLD G. HAAS.

References Cited in the file of this patent

UNITED STATES PATENTS

| Number | Name | Date |
|---|---|---|
| 1,552,781 | Van Arco | Sept. 8, 1925 |
| 1,563,140 | Van Arco | Nov. 24, 1925 |
| 1,774,673 | Schleicher | Sept. 2, 1930 |
| 1,776,592 | MacDonald | Sept. 23, 1930 |
| 1,959,161 | Grondahl | May 15, 1934 |
| 2,284,649 | Grabau | June 2, 1942 |
| 2,448,442 | Kirschbaum | Aug. 31, 1948 |
| 2,464,439 | Davis | Mar. 15, 1949 |
| 2,492,540 | Smith | Dec. 27, 1949 |
| 2,524,166 | Gartner | Oct. 3, 1950 |